US005590967A

United States Patent [19]

Kapaan

[11] Patent Number: 5,590,967
[45] Date of Patent: Jan. 7, 1997

[54] BEARING UNIT FOR A VEHICLE WHEEL

[75] Inventor: Hendrikus J. Kapaan, Nieuwegein, Netherlands

[73] Assignee: SKF Industrial Trading & Development Company B.V., Nieuwegein, Netherlands

[21] Appl. No.: 434,910

[22] Filed: May 3, 1995

[30]   Foreign Application Priority Data

May 6, 1994 [NL] Netherlands ............................. 9400752

[51] Int. Cl.$^6$ ................................................. F16C 19/06
[52] U.S. Cl. .......................... 384/448; 384/513; 384/544
[58] Field of Search .................................... 384/506, 513, 384/542, 569, 585, 448, 544

[56]              References Cited

U.S. PATENT DOCUMENTS 1,505,431   8/1924   Rollins .
1,615,253   1/1927   Baker .
3,757,883   9/1973   Asberg .

FOREIGN PATENT DOCUMENTS 0561437   9/1993   European Pat. Off. .

Primary Examiner—Lenard A. Footland
Attorney, Agent, or Firm—Young & Thompson

[57]              ABSTRACT

A bearing unit for a vehicle wheel, comprising a three-point or four-point bearing with an inner race and an outer race, each having a bearing groove containing a series of rolling bearings, which inner race is provided with elements for fixing the bearing to the vehicle suspension. A flange pointing radially outwards relative to the outer race is also provided, which outward-pointing flange interacts with and/or is connected to a flange pointing radially inwards relative to the outward-pointing flange.

25 Claims, 5 Drawing Sheets

BEARING UNIT FOR A VEHICLE WHEEL

FIELD OF THE INVENTION

The invention relates to a bearing unit for a vehicle wheel, comprising a three-point or four-point bearing with an inner race and an outer race, each having a bearing groove containing a series of rolling bearings, which inner race is provided with means for fixing the bearing to the vehicle suspension.

BACKGROUND OF THE INVENTION

Such a bearing unit is known from NL-A-9200511. In the case of this known bearing unit the conventional double-row bearing, which takes up a large amount of space in the axial direction and is also of relatively high weight, is replaced by a single-row bearing. Due to the relatively large diameter of the single-row bearing, not only is a good bearing number ensured, but such space is also created inside the bearing that, for example, parts of a constant-velocity joint can be accommodated. This permits a further reduction in the space required.

The known bearing unit has a flange pointing inwards relative to the outer race, to which flange the wheel, the brake disc and possibly also the constant-velocity joint can be fixed. Although the above-mentioned advantages can already be obtained with this design, its potential applications are relatively limited.

SUMMARY OF THE INVENTION

The object of the invention is to provide such a bearing unit which has a more universal application. That object is achieved through the fact that a flange pointing radially outwards relative to the outer race is provided, which outward-pointing flange interacts with and/or is connected to a flange pointing radially inwards relative to the outward-pointing flange.

The use of both a radially outward-pointing flange and a radially inward-pointing flange gives the bearing unit according to the invention more flexibility as regards the desired potential applications, as will be explained below with reference to various examples.

For example, the radially inward-pointing flange can be provided with means for fixing thereto a driving shaft or shaft end. This radially inward-pointing flange can have an opening defined by a bush, which bush can be made to interact with the shaft end of a constant-velocity joint.

If the bush extends until it is inside the inner race, a space-saving design is obtained.

In connection with the torque transmission, the bush can be provided with axial grooves on the inside, but alternatively, the bush can also have a triangular cross-section on the inside.

The inward-pointing flange can also bear a bush at one side and a wheel-centering piece at the other side. The outward-pointing flange can bear fixing means for a wheel.

According to the invention, the radially inward-pointing flange can be integral with the radially outward-pointing flange. The radially inward-pointing flange can also be integral with a wheel-centering piece.

In this design the radially inward-pointing flange can bear wheel bolts. In this case the bolt head of each wheel bolt can be situated between the outward-pointing flange and the inward-pointing flange.

According to an alternative wheel fixing, nut pieces into which wheel bolts can be screwed can be provided between the outward-pointing flange and the inward-pointing flange.

The inner race of the bearing used in the bearing unit according to the invention can consist of two inner race halves lying axially next to each other. In that connection, an annular carrier can be provided for the inner race, on which carrier the inner race halves are held against each other.

The carrier can have a raised edge on the outside at its axially outermost end, and a peripheral groove provided with a clamping ring at its other end. If the carrier and one of the inner race halves are of integral design, the other, loose inner race half can be fixed to the carrier by means of welding, using an energy source such as a laser source.

However, according to an alternative, the carrier can have a flanged edge extending in the axial direction until it is past the loose inner race half, which flanged edge is folded over after the loose inner race half is pushed onto the carrier, for the purpose of fixing said inner race half.

In a corresponding way, the outer race can consist of two outer race halves clamped against each other in the axial direction. Here again, one outer race half can be integral with the carrier, and the other, loose outer race half can be situated in a recess provided in the outer race. In this case the loose outer race half is clamped in the axial direction between the outer race and the radially inward-pointing flange.

BRIEF DESCRIPTION OF THE DRAWINGS

The invention will be explained in greater detail below with reference to a number of exemplary embodiments shown in the figures.

DETAILED DESCRIPTION OF THE INVENTION

Figure 1:
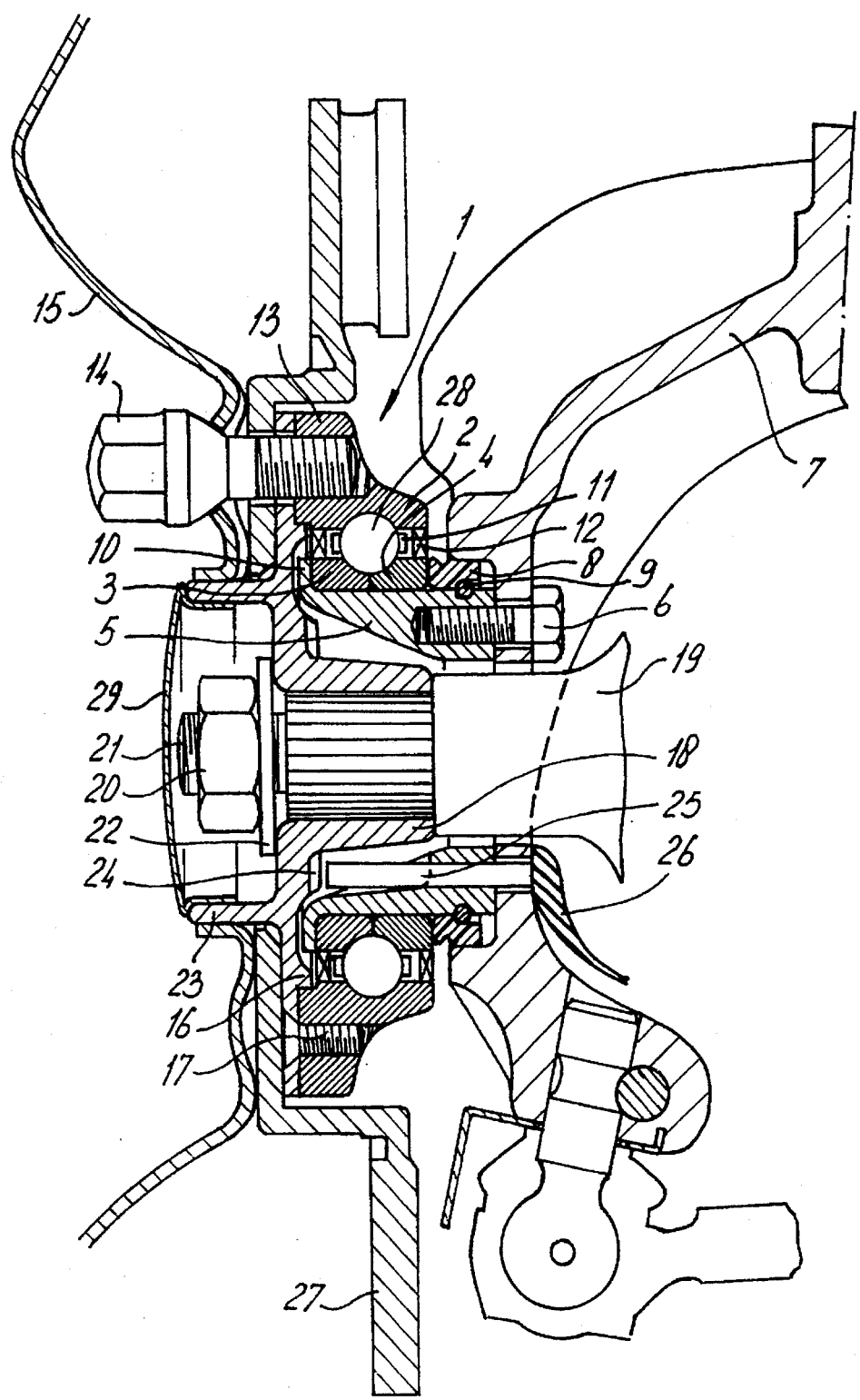
FIG. 1 shows a first exemplary embodiment of a bearing unit according to the invention, in radial section.

The bearing unit shown in FIG. 1 comprises a three-point or four-point bearing, indicated in its entirety by 1, containing an outer race 2, which is in one piece, and two inner race halves 3, 4, which together form the inner race of the bearing 1. The inner race halves 3, 4 are disposed on a carrier 5, which is fixed by means of bolts 6 on the wheel suspension 7 (not shown in any further detail) for a front wheel.

A supporting ring 8 is disposed on one side of the outer periphery of the carrier 6, which supporting ring is supported against a clamping ring 9. The inner race half 4 rests against said supporting ring 8. The other inner race half 3 is pressed under initial tension in the axial direction against the inner race half 4 by means of the flanged edge 10 of the carrier 5, with the result that the three-point or four-point bearing is obtained.

The bearing also comprises a bearing cage 11, and has seals 12.

As can be seen further in FIG. 1, the outer race 2 of the bearing 1 has a radially outward-pointing flange 13, into which wheel bolts 14 are screwed, in order to fix the wheel 15. A radially inward-pointing flange 16 is fixed by means of bolts 17 to said radially outward-pointing flange 13 of bearing 1. The radially inward-pointing flange 16 is provided with a bush 18 which extends until it is inside the inner race formed by the inner race halves 3, 4 and the carrier 5.

The shaft end 19 of the constant-velocity joint (not shown in any further detail) is fixed in said bush by means of key grooves. Said fixing is secured by means of nut 20, which is screwed onto the thread end 21 of shaft end 19, and washer 22.

The flange 16 also has an axially outward-pointing centering ring 23, on which the wheel 15 is centred. A covering cap 29 can be provided on the centering ring.

In addition, the flange 16 has a toothing 24, forming part of an anti-lock braking system. A sensor 25 is mounted in the carrier 5 opposite said toothing 24. The signals coming from the sensor 25 can be fed by means of cable 26 to the central control unit of the anti-lock braking system.

The brake disc 27 can also be fixed by means of the bolts 17 to the axially outermost side of the flange 16.

Figure 2:
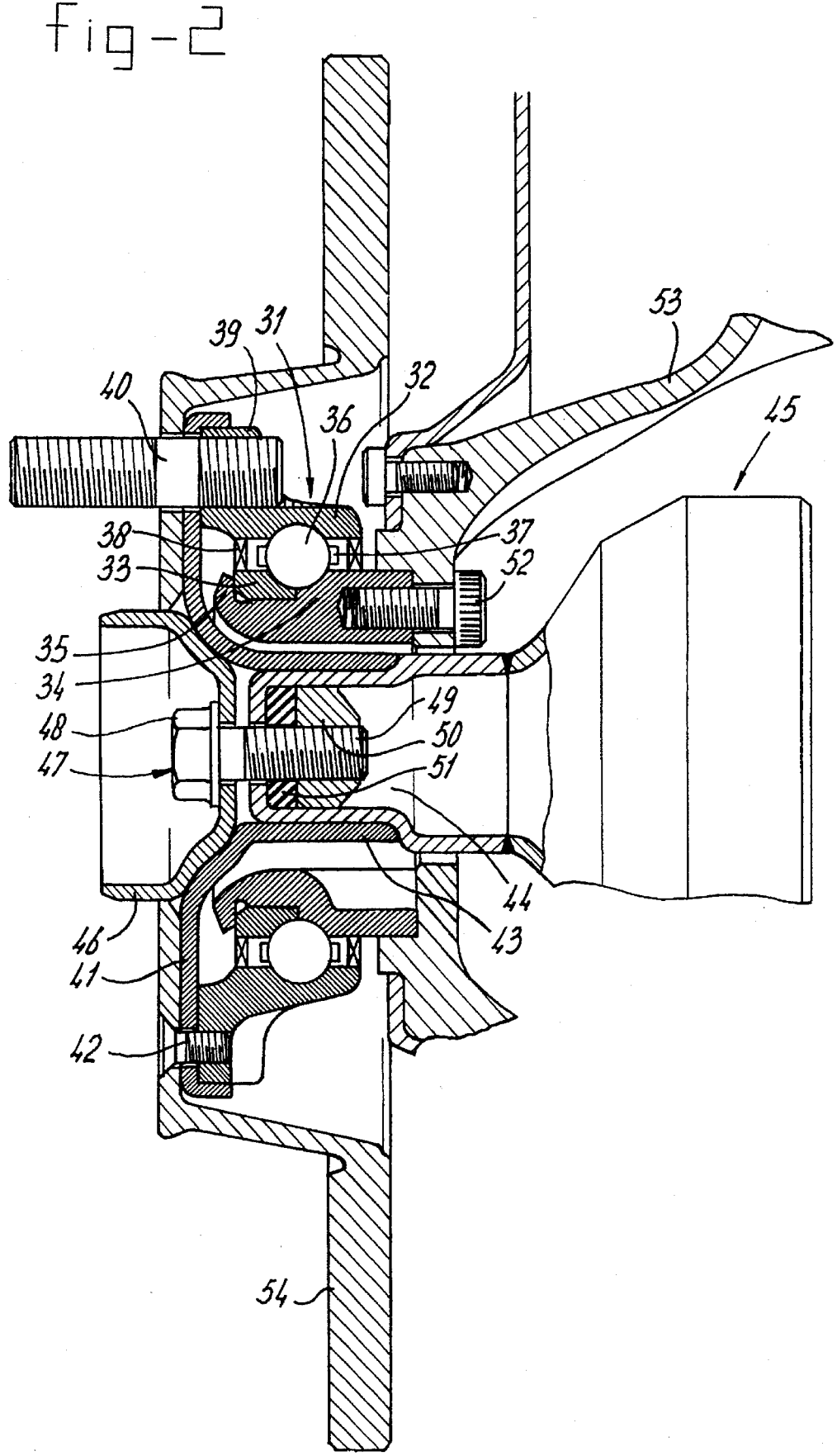
FIG. 2 shows a second exemplary embodiment.

In the exemplary embodiment shown in FIG. 2 a bearing 31 which has an outer race 32 is used. The inner Face consists of inner race halves 33, 34. Inner race half 34 also acts as a carrier for the other inner race half 33 in this case. The inner race half with carrier 34 has on its axially outermost end a flanged edge 35, by means of which the inner race half 33 is held pressed under initial tension against the inner race half 34.

Both races have a groove in which a series of balls 36 is accommodated. The balls are kept at a distance from each other by means of cage 37, and there are also seals 38. The outer race 32 has an outward-pointing flange 39, in which threaded ends 40 are fixed, onto which threaded ends wheel nuts can be screwed.

An inward-pointing flange 41 is fixed to the outward-pointing flange 39 by means of bolts 42. The inward-pointing flange 41 is made from sheet material integrally with a bush 43 extending in the axial direction until it is inside the carrier with inner race half 34, which bush has a triangular cross-section which is known per se. The shaft end 44 of the constant-velocity joint indicated in its entirety by 45 has a corresponding cross-section, in such a way that a driving torque can be transmitted to the bush 43, thus also the flange 41 and flange 39.

There is a loose centering ring 46, which has a central hole into which the bolt 47 is inserted. The latter rests with its head 48 on the outside of the centering ring 46, and is screwed with its shank 49 into a nut piece 50 which rests by means of a flexible ring 51 in the inside of the shaft end 44. The desired initial tension can be maintained between constant-velocity joint and flange 41 in this way.

The carrier with inner race half 34 is fixed by means of bolts 52 to the front wheel suspension 53 (not shown in any further detail).

The brake disc 54 can also be fixed to flanges 41 and 39 by means of the bolts 42.

Figure 3:
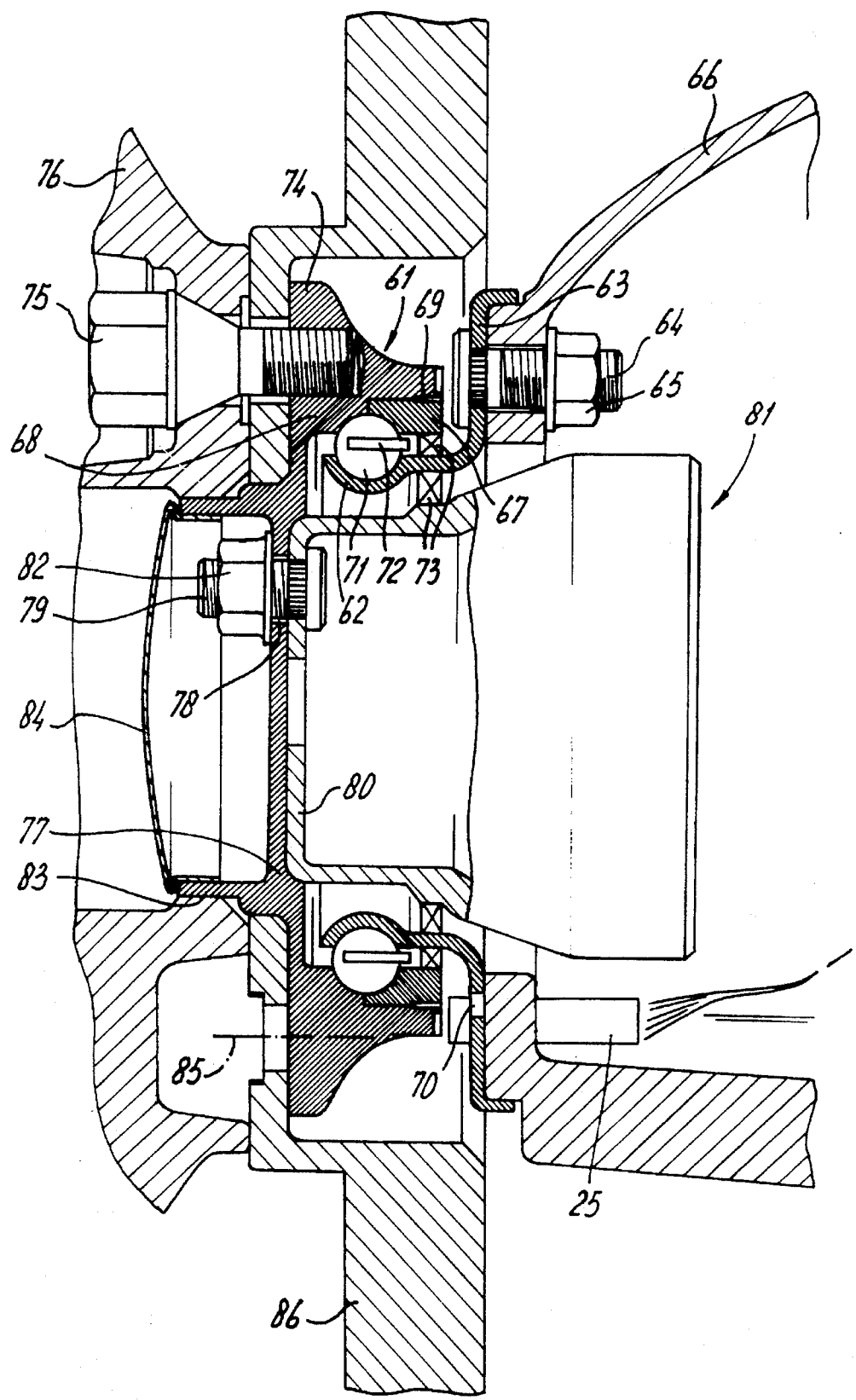
FIG. 3 shows a third exemplary embodiment.

In the case of the exemplary embodiment shown in FIG. 3, a bearing indicated in its entirety by 61 is used, which bearing has an inner race 62 which is made from sheet material and has a radially outward-pointing flange 63. The flange 63 is fixed by means of bolts 64 and nuts 65 to the front wheel suspension 66 (not shown in any further detail).

Bearing 61 also has outer race halves 67 and 68. Outer race half 68 is in the form of a carrier for outer race half 67. At the position of the weld 69, which can be provided through opening 70 in flange 63 by means of an energy beam, such as a laser beam or electron beam, outer race halves 67 and 68 are fixed to each other under initial tension in the axial direction.

The bearing 61 also has bells 71, a cage 72, and seals 73.

Outer race half 68 has an outward-pointing flange 74, into which the wheel bolts 75 by means of which the wheel 76 is fixed are screwed. A radially inward-pointing flange 77 is provided integrally on the radially outward-pointing flange 74. Disposed in this flange are openings 78, through which bolts 79 project, which bolts are fixed to the end face of the shaft end 81 of a constant-velocity joint (not shown in any further detail).

The flange 77 and the end face 80 are fixed to each other by means of nuts 82.

The flange 77 also has an axially outward pointing centering ring 83, on which the wheel 76 is centered. The centering 83 is sealed by means of covering cap 84.

The brake disc 86 can be fixed to the outward-pointing flange 74 of the outer race half 68 by means of bolts (not shown in any further detail), only the axis 85 of which can be seen.

Figure 4:
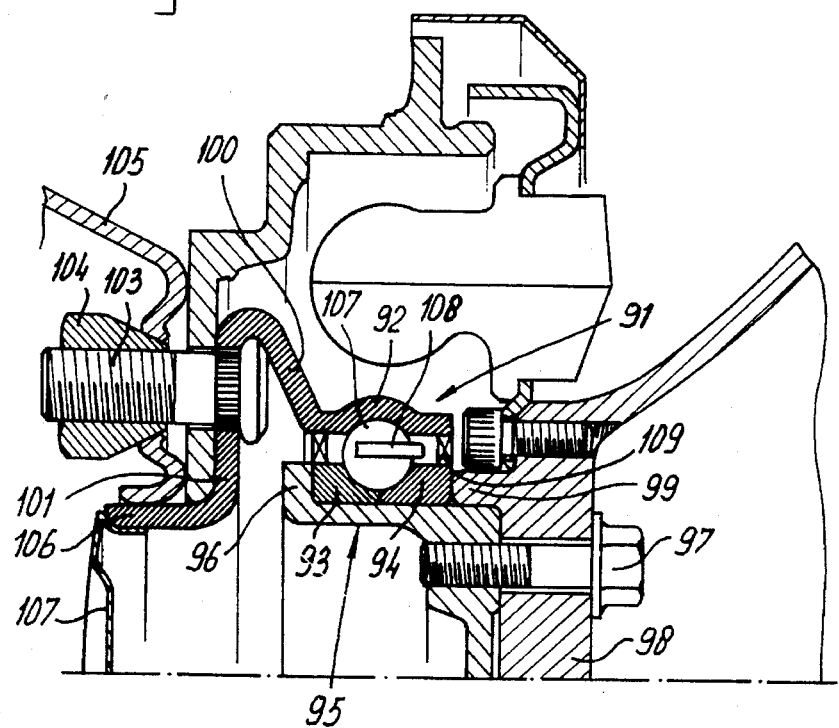
FIG. 4 shows a fourth exemplary embodiment.

The embodiment shown in FIG. 4 relates to a non-driven bearing unit which has a bearing 91 with an outer race 92 made of sheet material and an inner race consisting of inner race halves 93, 94. The inner race halves 93, 94 are accommodated on a carrier 95, which has on its axially outermost side an outward-pointing flange 96. The carrier 95 is fixed by means of bolts 97 to the wheel suspension 98. The wheel suspension has a shoulder 99, against which the inner race half 94 rests. The two race halves 93, 94 are clamped between flange 96 and shoulder 99 by tightening the bolts 97.

The outer race half 92 of bearing 91 has an outward-pointing flange 100, which passes integrally into an inward-pointing flange 101. Fixed in this inward-pointing flange 101, in the holes 102, are bolts 103, onto which nuts 104 are screwed, in order to fix wheel 105.

The inward-pointing flange 101 has an axially outward-pointing centering ring 106, on which the wheel 105 is centered. The opening in centering ring 106 is shut off by means of covering cap 107.

The bearing 91 also has balls 107, a cage 108, and seals 109.

Figure 5:
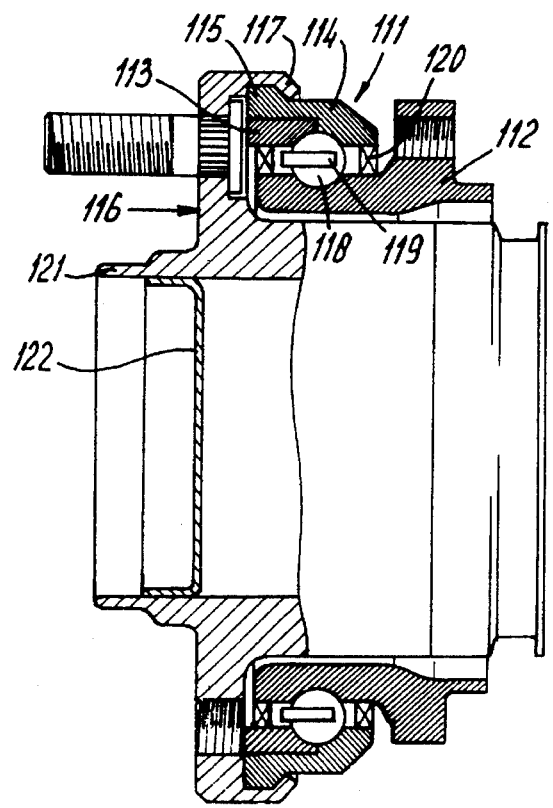
FIG. 5 shows a fifth exemplary embodiment.

The embodiment shown in FIG. 5 also relates to a non-driven variant of the bearing unit according to the invention. The bearing 111 used there has an inner race 112, and also outer race halves 113, 114. Outer race half 114, which acts as a carrier for inner race half 113, has a flange 115 projecting outwards a little. The inward-pointing flange 116 is fixed by means of the flanged edge 117 to said outward-pointing flange 115. When the flanged edge 117 is being folded over, the outer race half 113 is also pressed under initial tension in the axial direction against outer race half with carrier 114.

The bearing also has balls 118, a cage 119, and seals 120.

The radially inward-pointing flange 116 can have an axially outward-pointing centering ring 121, which is covered by means of cap 122.

Figure 6:
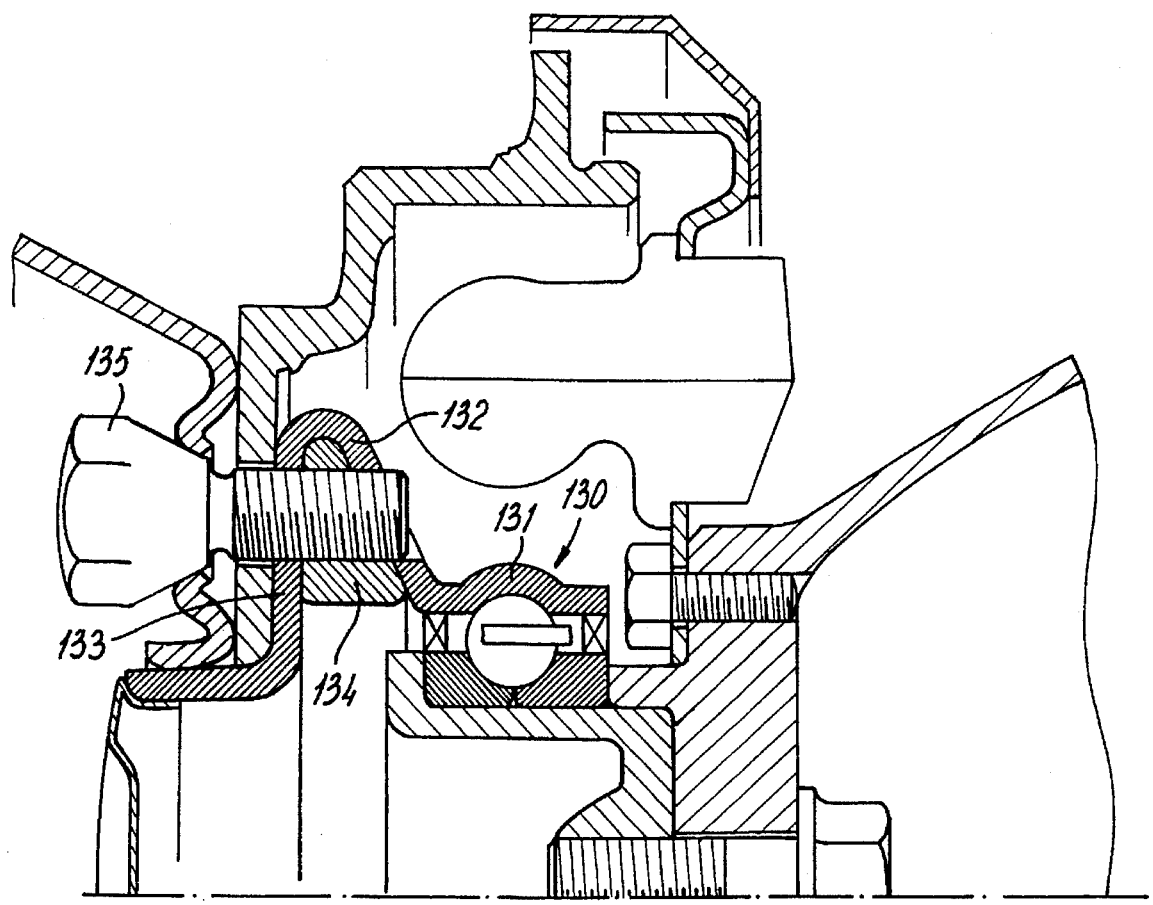
FIG. 6 shows a sixth exemplary embodiment.

In the embodiment shown in FIG. 6 a bearing 130 which has an outer race 131 with an outward-pointing flange 132 is used. An inward-pointing flange 133 is used on the outward-pointing flange 132, in the same way as in the embodiment of FIG. 5.

A ring 134, in which tapped holes are provided for the wheel bolts 135, is provided between the flanges 131, 132.

The remaining details of this exemplary embodiment correspond to those of FIG. 5, and will therefore not be discussed any further here.

I claim:

1. Bearing unit for a vehicle wheel, comprising a three-point or four-point bearing with an inner race and an outer race, each of said inner race and outer race having an axially inner end and an axially outer end, each of said inner race and outer race having a bearing groove containing a series of rolling elements, said inner race including at its axially inner end means for fixing the bearing to a vehicle suspension, said outer race including at its axially outer end a first flange pointing radially outwards relative to the outer race, said outward-pointing flange interacting with and/or being connected to a second flange pointing radially inwards relative to the outward-pointing flange.

2. Bearing unit according to claim 1, wherein the radially inward-pointing flange includes means for fixing a driving shaft or shaft end thereto.

3. Bearing unit according to claim 2, wherein the radially inward-pointing flange has an opening defined by a bush, which can be made to interact with the shaft end of a constant-velocity joint.

4. Bearing unit according to claim 3, wherein the bush extends until it is inside the inner race.

5. Bearing unit according to claim 4, wherein the bush includes axial grooves on the inside.

6. Bearing unit according to claim 4, wherein the bush has a triangular cross-section on the inside.

7. Bearing unit according to claim 4, wherein the inward-pointing flange bears a bush at one side and a wheel-centering piece at the other side.

8. Bearing unit according to claim 1, wherein the radially outward-pointing flange bears fixing means for a wheel.

9. Bearing unit according to claim 1, wherein the radially inward-pointing flange is integral with the radially outward-pointing flange.

10. Bearing unit according to claim 9, wherein the radially inward-pointing flange is integral with a wheel centering piece.

11. Bearing unit according to claim 9, wherein the radially inward-pointing flange bears wheel bolts, with each wheel bolt having a bolt head.

12. Bearing unit according to claim 11, wherein the bolt head of each wheel bolt is situated between the outward-pointing flange and the inward-pointing flange.

13. Bearing unit according to claim 9, further comprising nut pieces for screwing wheel bolts thereinto, said nut pieces being positioned between the outward-pointing flange and the inward-pointing flange.

14. Bearing unit according to claim 1, wherein the inner race is comprised of two inner race halves lying axially next to each other.

15. Bearing unit according to claim 14, further comprising an annular carrier for the inner race, and said inner race halves being held against each other on said carrier.

16. Bearing unit according to claim 15, wherein the carrier has a raised edge on the outside at its axially outermost end and a peripheral groove with a clamping ring at its other end.

17. Bearing unit according to claim 15, wherein the carrier bears a sensor for measuring the rotation of the outer race or the inward-pointing flange.

18. Bearing unit according to claim 15, wherein the carrier and one of the inner race halves are integral.

19. Bearing unit according to claim 18, wherein the carrier and the other, loose inner race half are welded to each other.

20. Bearing unit according to claim 18, wherein the carrier has a flanged edge extending in the axially direction until it is past the other, loose inner race half, said flanged edge being folded over after the loose inner race half has been pushed onto the carrier, for the purpose of fixing said inner race half.

21. Bearing unit according to claim 1, wherein the outer race is comprised of two outer race halves lying next to each other in the axial direction.

22. Bearing unit according to claim 21, further comprising a carrier integral with one outer race half, and the other, loose outer race half being situated in a recess provided in the carrier.

23. Bearing unit according to claim 21, further comprising a carrier integral with one outer race half, and the other, loose outer race half is clamped in the axial direction between the carrier and the radially inward-pointing flange.

24. Bearing unit according to claim 23, wherein the outer race or the inward-pointing flange bears a toothing.

25. Bearing unit according to claim 1, wherein the inner race bears a sensor for measuring the rotation of the outer race or the inward-pointing flange.

* * * * *